United States Patent Office 2,893,217
Patented July 7, 1959

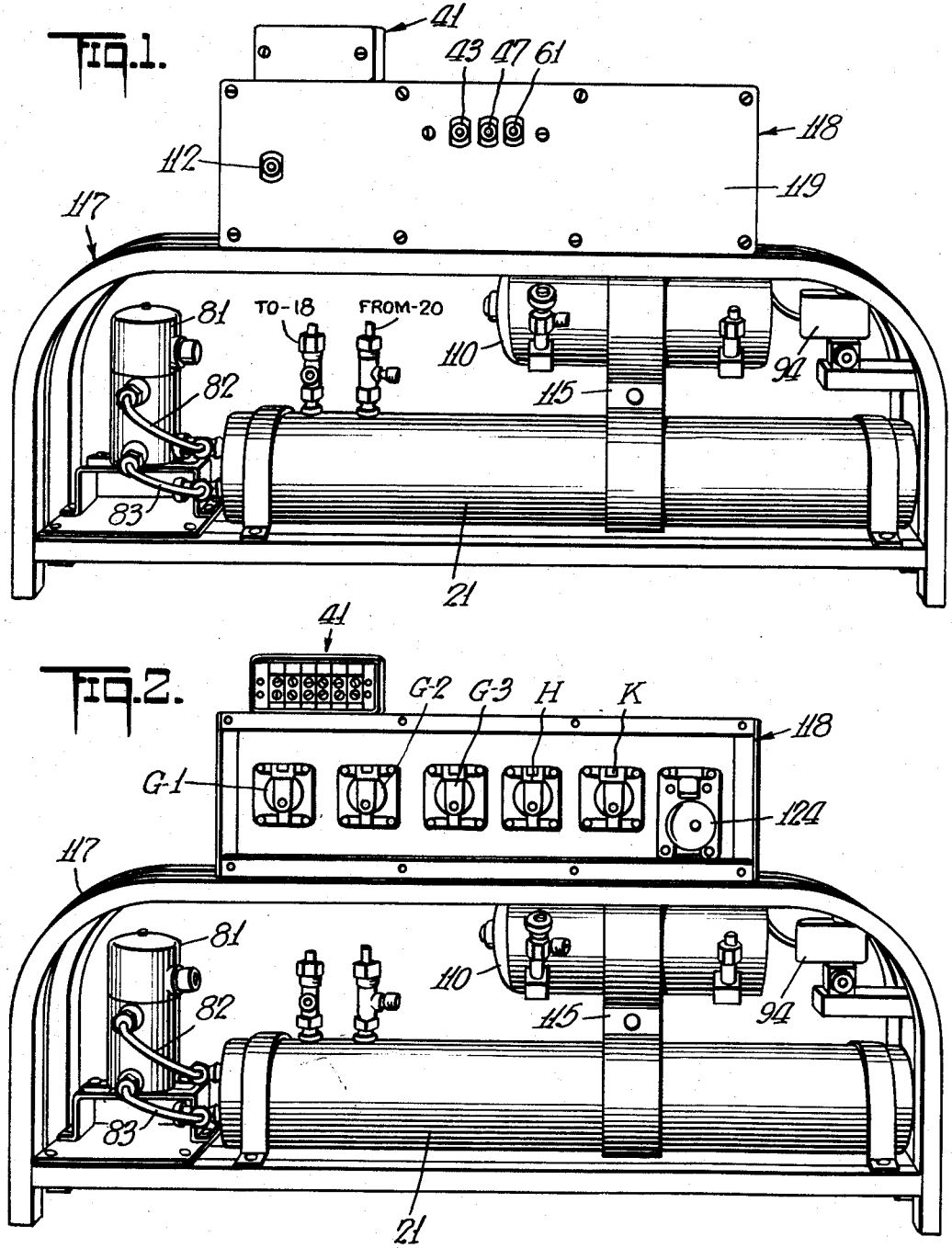

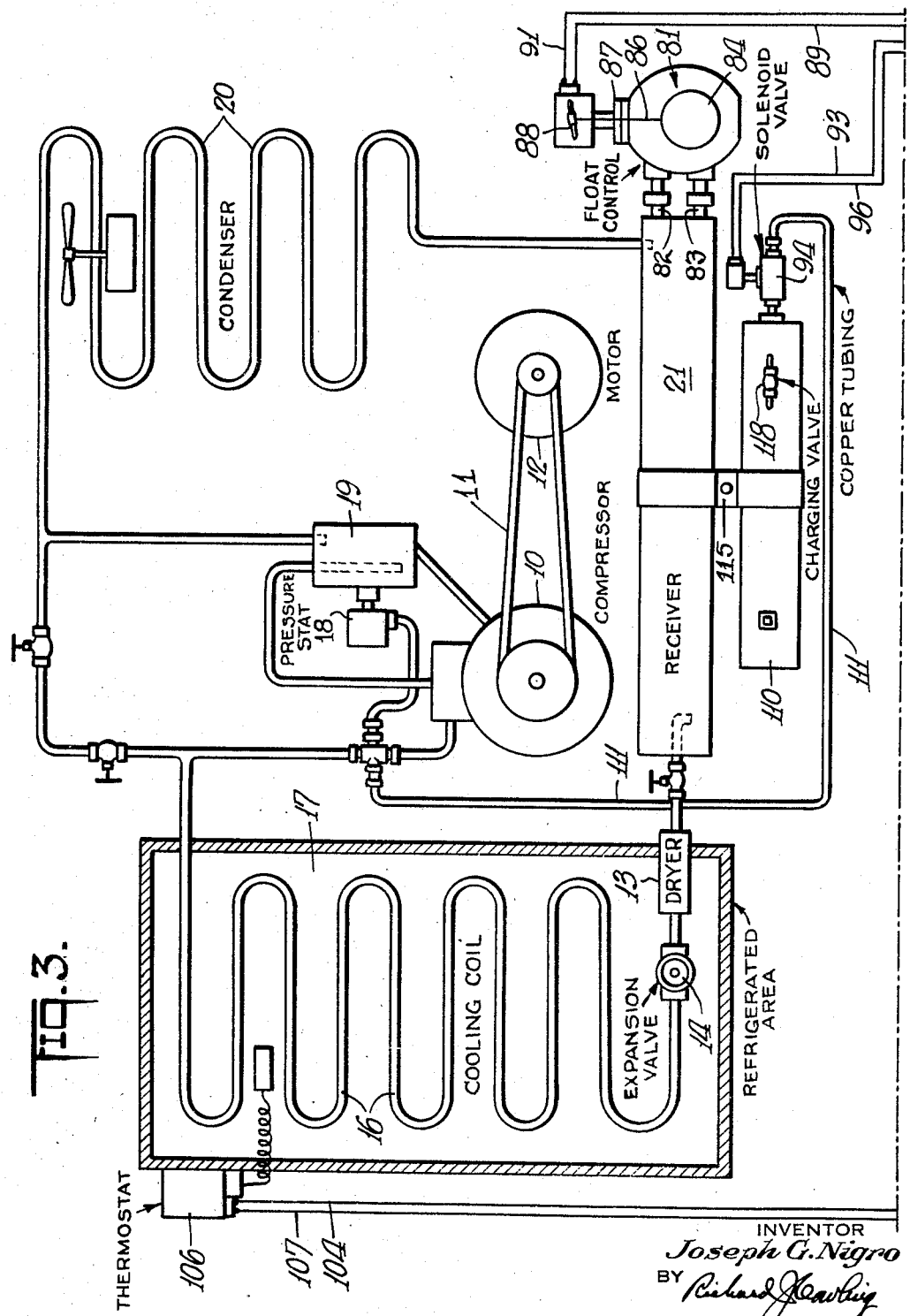

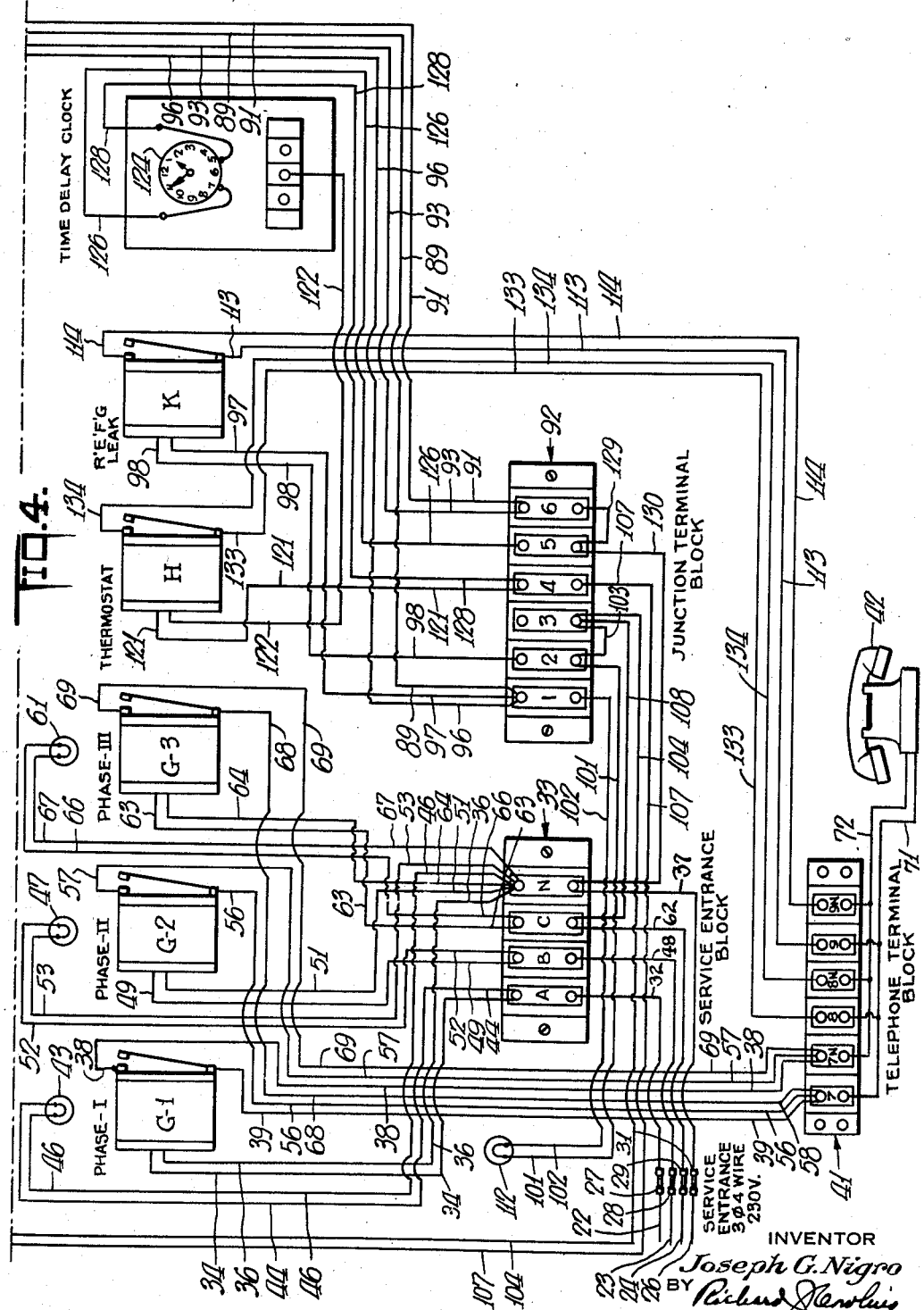

2,893,217

AUTOMATIC REFRIGERANT CHARGING SYSTEM COUPLED WITH AN AUTOMATIC ALARM TO A CONVENTIONAL WARNING SYSTEM

Joseph G. Nigro, Oceanside, N.Y.

Application October 10, 1955, Serial No. 539,347

15 Claims. (Cl. 62—126)

The present invention relates generally to mechanical refrigerating systems, and it has particular relation to a portable or detachable control which is capable of automatically charging a refrigerating system with additional refrigerant when its original supply becomes low and at the same time of giving a warning alarm both at the point of installation of said system and at a remotely located station of a conventional telephone, fire alarm or burglary warning system.

Heretofore, such refrigerating systems as are installed in grocery stores, drug stores, meat markets, super markets, warehouses and the like, have had no fully automatic recharging means for replacing refrigerant in said systems when the original supply becomes low and for indicating an alarm either at the place of installation or a place remotely distant therefrom. Consequently, in many instances, a watchman or other service man was required to be present at all times to insure satisfactory operation of the refrigerating unit and to manipulate valves to recharge the system when a failure occurred. In establishments where the installation was not large enough to warrant the expense of having round-the-clock supervision, it has been impossible for the owner or operator to secure insurance covering the contents of his refrigerated area against loss and damage due to lack of proper refrigerating temperatures.

With the present invention all such refrigerating systems and/or installations may be easily, conveniently and cheaply equipped with a portable and/or detachable unit that will not only recharge or replace any loss of refrigerant in said systems, but will also give a warning alarm not only at the place of installation but also at any remotely located place equipped with a conventional telephone, fire alarm or burglary warning system. This novel and efficient attachment eliminates the disadvantages and hazards of unprotected systems and enables an owner or operator to secure indemnity insurance at nominal cost against the loss of the perishable contents of such refrigerating systems.

An object of the invention is to provide a simple, efficient and inexpensive method of recharging a refrigerating system with additional refrigerant when its original supply of refrigerant drops below a satisfactory and efficient operating level.

Another object of the invention is the provision of a simple, durable, efficient and inexpensive attachable means for recharging a refrigerating system with refrigerant when its original supply drops below a satisfactory and efficient operating level and for giving an alarm when such recharging has taken place.

A further object of the invention is to provide a novel and efficient device for indicating a warning not only at the place of installation when a refrigerating system is not working properly, but is also capable of indicating a warning at a place remotely distant therefrom through a conventional telephone, fire alarm or burglary warning system.

Another object of the invention is the provision of an efficient and inexpensive device for indicating a warning signal at a place remotely distant from the refrigerating system to which it is attached by using a conventional telephone, fire alarm or burglary warning system when said system is not working properly and before there is any dangerous rise in the temperature in the refrigerated area.

A further object of the invention is to provide a simple, efficient and inexpensive attachment for refrigerating systems which will indicate a warning both at the place of installation and at a remotely distant place therefrom over a conventional telephone, fire alarm or burglary warning system when additional refrigerant is supplied to said system from an auxiliary source of supply.

Another object of the invention is to provide a simple, efficient and inexpensive attachment for refrigerating systems which will indicate a warning both at the place of installation and at a place remotely distant therefrom over a conventional telephone, fire alarm or burglary warning system when the refrigerating system is not operating properly due to a clogged pipe, moisture, motor trouble, blown fuses, etc.

A further object of the invention is to provide a simple, efficient and inexpensive attachment for refrigerating systems which will sound a warning alarm when the operating mechanisms are all functioning properly but the temperature in the refrigerated area drops below a minimum setting due to the storage of large quantities of warm food in said area or due to the entrance door being opened for too long a time, said warning being delayed a sufficient length of time to permit the temperature in said refrigerated area to return to normal so that no unnecessary warning will be given if the temperature is able to correct itself within a reasonable length of time.

Various other and further objects and advantages of the invention, which result in simplicity, economy and efficiency, will be apparent from the following detailed description, wherein a preferred form of embodiment is shown, reference being had to the accompanying drawings for illustrative purposes, wherein like numerals indicate like parts, in which:

Figure 1 is a front elevational view of a portable or detachable recharging and warning attachment constructed in accordance with the principles of the invention for use with a conventional refrigerating system;

Figure 2 is a front elevational view of the portable or detachable unit shown in Figure 1, with its front cover plates removed to show the arrangement of its various parts, such as relays, float valve, solenoid valve, terminal blocks, etc.; and Figure 3 is a diagrammatic view of a conventional refrigerating system with the portable or detachable unit's operating parts shown removed therefrom and how they are connected to said system; and Figure 4 is a diagrammatic view showing a detailed wiring diagram for the several operating parts shown connected to the refrigerating system of Figure 3, and including a connection with a source of electrical energy and a connection with a conventional telephone, fire alarm or burglary warning system.

*Introduction*

The portable or detachable unit comprising the present invention is a device so designed that it will operate when the refrigerant, such as freon, ammonia, sulphur dioxide, methyl chlorine, ethyl chloride, etc., in such systems drops below the required level for normal and efficient operation.

The unit consists of a compact case or frame structure including an auxiliary tank for holding an additional quantity of emergency refrigerant, a solenoid valve for releasing the refrigerant from the auxiliary tank into the refrigerating system, a warning indicator such as a bell or light, a float valve adapted to be connected with the main refrigerant receiver of the refrigerating system to which it is to attached, which, in turn, operates a mercury switch that controls a solenoid valve on the auxiliary tank. When the liquid level in the main refrigerant receiver becomes low for any reason, such as a leak, a float drops and operates a mercury switch, which, in turn, energizes a solenoid valve, thereby permitting the introduction of additional refrigerant into the refrigerating system. When sufficient additional refrigerant is added to the system, the liquid level in the main refrigerant receiver will rise, carrying with it the float, which, in turn, causes the mercury switch to cut-off the flow of electricity to the solenoid valve, thereby closing the same and cutting off the discharge of additional refrigerant from the auxiliary tank into the refrigerating system.

It will be obvious that the above described cycle will renew itself as refrigerant is required until the auxiliary tank is exhausted. Whenever a recharging has taken place or is taking place, the unit will give an alarm, either by light or gong, or both, at the place of installation of the refrigerating system and also over a conventional telephone, fire alarm or burglary system to which it has been connected. Thus, it will be appreciated that an alarm will be given long before the temperature in the refrigerated area can drop to a dangerous point where the merchandise stored in the refrigerated area can spoil or any other type of damage can happen.

Provision has also been made for giving an alarm after a delayed period of time, if the temperature has risen above the maximum setting in the regrigerated area, even when the mechanical refrigerating unit is operating satisfactory. There are also times when large quantities of new food supplies may be stored in said refrigerated area, which supplies are too warm to permit the refrigeration unit to maintain a proper refrigerated temperature for a short period of time. Then there may be times when the entrance door or doors to said refrigerated area have been open too long, as for example, during the delivery or removal of packages therefrom over too long a sustained period, or, when said door has not been closed tightly. In such situations, the temperature in said refrigerated area may rise above the maximum setting even though the mechanical refrigerating unit is operating satisfactory and in a short period of time will be able to correct the temperature within the refrigerated area to within the proper range. In such instances, there is no danger of spoilage to the contents of said refrigerated area, and it would be useless and unnecessary to give a warning signal at a remotely located station, calling for a personal inspection of said system. Accordingly, provision has been made, under such circumstances, to delay said warning signal for a given period of time, as for example, two hours. Thus, if the temperature in said refrigerated area has not been corrected within said delayed two hour period, a warning signal will be given over the telephone, fire alarm or burglary warning system, asking for personal inspection of said system covering said refrigerated area. However, if the temperature has been corrected within said delayed period of time, no warning will be sent out over said warning system.

The refrigerating system

Referring now to the drawings, and particularly to Figure 3 thereof, there is shown a conventional refrigerating system comprising a compressor 10, driven by a belt 11 connected with an electric motor 12, which is operated from an outside source of power (not shown). The refrigerating system, in addition to the compressor 10, consists of a dryer 13, an expansion valve 14, refrigerating coils 16 mounted within a refrigerated area or room 17, a pressure-stat control 18, an oil trap 19 and condenser 20 connected to a main refrigerant receiver 21 for holding its supply of liquid refrigerant. In the illustration described, the condenser 20 is shown to be of the air-cooled type, but it will be obvious to those skilled in the art that a water-cooled condenser or any other type of condenser may be used efficiently.

Since the detailed operations of the conventional refrigerating system forms no part of this invention and since the various parts thereof are all of a conventional construction and their operations are well known to those skilled in the art, it is not believed a further explanation of the refrigerating system is necessary or required for a complete and thorough understanding of the present invention.

The source of electric power

The attachable unit forming the subject-matter of the present invention also obtains its electric energy from an outside source of power (not shown), which is connected in parallel with the source of power used to operate the motor 12 although the connections are not shown in the drawings.

It will be immediately apparent to those skilled in the art from the wiring diagram comprising Figure 4 that the invention is illustrated as being energized by a three phase alternating current with a common or neutral fourth wire ground return. However, the type of current used is a matter of choice or availability, and it should be obvious that the invention may be operated from a single phase or two phase electrical circuit as efficiently. The wiring diagrams for such circuits have not been shown in the drawings since they are elementary and well within the skill of the average electrician.

The electric power to operate the invention in the illustration shown in the drawings is received from an outside source of supply through the lead-in wires 22, 23, 24 and 26, which, in turn, are connected with conventional fuses 27, 28, 29 and 31, respectively.

The electric circuit—phase I

Phase I of the electrical circuit, which uses the incoming lead-in wire 22 and the neutral or common ground wire 26, operates the relay G–1 and its pilot light 43, the relay being normally open and the pilot light being normally lighted.

The incoming or lead-in wire 22 and its fuse 27, which is connected by a wire 32 to the terminal A of a service entrance block 33, forms its circuit through a wire 34 leading to the relay G–1, which is normally open and a return wire 36 leading back to the terminal N of said service entrance block 33. The terminal entrance block 33 has its terminal N connected by a wire 37 leading to a fuse 31 which is, in turn, connected with the ground or neutral fourth wire 26.

When either or both of the fuses 27 and 31 blow, the electric circuit to the relay G–1 will be de-energized, permitting the same to close. Closing of its contacts with the wires 38 and 39 energizes the same from energy obtained from its connected warning system. The wire 38 connects the relay G–1 to the terminal 7–N of the telephone terminal block 41, and the wire 39 connects with the terminal 7 of said telephone terminal block 41, thereby causing a warning to be sent over said telephone, fire alarm or burglary warning system to a remotely distant station 42.

The pilot light 43 for phase I of the electric circuit, which is always burning when the relay G–1 is open, being connected in parallel therewith, is connected by its wire 44 to the terminal A of the service entrance block 33, and its circuit is completed through its wire 46 connected with the terminal N of said service entrance block 33. When said pilot light 43 is extinguished with the closing of its relay G–1, its circuit is de-energized and its light is extinguished.

The electric circuit—phase II

Phase II of the electrical circuit, which is formed through the wire 23 and the neutral or common ground wire 26, operates the relay G-2 and its pilot light 47, the relay G-2 being normally open and the pilot light 47 being normally lighted.

The lead-in wire 23 of phase II is connected in series with its fuse 28, which, in turn, is connected by the wire 48 to the terminal B of the service entrance block 33. The opposite end of the terminal B connects with a wire 49, leading to the relay G-2, which, in turn, is connected into an electrical circuit by a return wire 51, leading back to the terminal N of said service terminal entrance block 33. Terminal N of said service entrance block 33 is also connected at its opposite end to the common ground wire 37, thereby completing its circuit through the fuse 31 to the fourth or neutral return wire 26.

The pilot light 47 of phase II is connected by the wire 52 with the service entrance terminal B and its circuit is completed by the return wire 53, leading back to the terminal N of the service entrance block 33, whose opposite end is connected through the wire 37 and fuse 31 to the neutral or common ground wire 26.

It will be appreciated that the above described circuit maintains the relay G-2 normally open and its pilot light 47 normally lighted. When either or both of the fuses 28 or 31 are blown, the pilot light 47 goes out and the relay G-2 closes, whereupon a circuit is formed through the wires 56 and 57 to the telephone terminal block 41, the wire 56 being connected to the terminal 7 and the wire 57 being connected to the terminal 7-N. Thus, it will be apparent from these connections that said relay G-2 and its pilot light 47 are connected in parallel on phase II of said source of electrical energy, which comprises the wires 23 and 26 thereof, and that, when the pilot light 47 goes out and the relay G-2 closes, a circuit is set up through the wires 56 and 57 to the telephone terminal block 41 and through its connecting terminals 7 and 7-N to a remotely located telephone station 42 over the wires 71 and 72.

*The electric circuit—phase III*

Phase III of the electrical circuit, which is formed through the wire 24 and the common fourth or ground wire 26, not only operates the relay G-3 and its pilot light 61, but also provides the operating source of electrical energy for the float control, the solenoid valve, the thermostat and the time delay clock. Each of these controls will be hereinafter more fully and completely described in detail.

The lead-in wire 24 is connected in series with its fuse 28, which, in turn, is connected by the wire 62 to the terminal C of the service entrance block 33. The opposite end of terminal C is connected with a wire 63 leading to the relay G-3, which is, in turn, connected into an electrical circuit by a return wire 64, leading to the terminal N of said service block 33. Terminal N of said service block 33 is also connected at its opposite end to the common ground wire 37, thereby completing its circuit through the fuse 31 with the ground wire 26.

The pilot light 61 of phase III is connected by a wire 66 to the opposite end of terminal C of the service entrance block 33, and its circuit is completed by a wire 67 leading back to the terminal N of said service entrance terminal block 33, whose opposite end is connected by the wire 37 and fuse 31 to the ground wire 26.

This circuit maintains the relay G-3 normally open and its pilot light 61 normally lighted. When either or both of the fuses 29 or 31 are blown, the pilot light 61 will go out and the relay G-3 will be allowed to close, whereupon a circuit will be set up through the wires 68 and 69. The wire 68 leads to the terminal 7 of the telephone terminal block 41, and the wire 69 leads to the terminal 7-N of the telephone service block 41, and through its connecting wires 71 and 72 to a remotely distant station 42 on a telephone, fire alarm or burglary warning circuit.

*The operation of the float valve, solenoid valve and auxiliary tank of refrigerant*

The main refrigerant receiver 21 of the conventional refrigerating system is shown provided with a conventional float valve 81 connected by means of vertically spaced pipes 82 and 83 intermediate one end of said main refrigerant receiver 21, which permits the float 84 of the float valve 81 to rise and fall with the level of liquid refrigerant in system as will be indicated satisfactorily by the level of the liquid refrigerant in the main refrigerant receiver 21. The float 84 has an upwardly extending float arm 86, which is slidably mounted and properly sealed in any conventional manner through the sidewall of the float valve housing 81, as indicated at 87. The upper end of the float arm 86 is connected to a conventional mercury type electrical switch 88.

The mercury switch 88 is constructed and installed to remain open and not be energized when the liquid refrigerant in the main refrigerant receiver 21 is within suitable operating levels within predetermined minimum and maximum settings. Obviously, the float arm 86 is constructed so as to permit suitable manual adjustments (not shown) to provide for such minimum and maximum settings as may be desired.

When the level of the liquid refrigerant in the main receiver 21 drops, the float 84 of the float valve 81 will drop a corresponding distance, drawing down its float arm 86. When the float arm 86 passes below its minimum setting, the mercury switch 88 will be tilted forwardly into a position that will energize the circuit formed by its connecting wires 89 and 91. The wire 89 leads to the terminal 1 of the junction block terminal 92, and the wire 91 leads back to the terminal 6 of said junction block terminal 92.

The terminal 6 of the junction block terminal 92 also has a wire 93 connecting with a conventional solenoid valve 94. The solenoid valve 94 has a second wire 96, which completes its circuit, connected back to the terminal 1 of the junction block terminal 92. Terminal 1 of the junction block terminal 92 also has a wire 97 leading to the relay K, which is maintained in a normally open position. A wire 98, which forms a circuit to the relay K with the wire 97, leads to the terminal 2 of the junction block terminal 92. The opposite end of terminal 2 of said block 92 has a wire 101 leading to one side of an emergency light 112, whose other wire 102 leads to the terminal 1 of junction block 92.

Terminal 2 of junction block 92 is also connected by the wire 103 to terminal 3 thereof, and said terminal 3 has a wire 104 connecting it with a thermostat 106, which is mounted in relation to the refrigerating area 17 as to be operable between certain predetermined minimum and maximum temperature settings. The circuit to the thermostat 106 is completed through the wire 107 leading to the terminal 4 of the junction block 92.

Electrical energy to the terminals 2 and 3 of the junction block 92 is maintained through the wire 108, which connects with terminal C of phase III of service entrance block 33.

When the mercury switch 88 is energized by being tilted forwardly due to the float arm 86 being drawn downwardly because of its float 84 being lowered by a lower liquid level in the float chamber 81 due to a corresponding lowering of the liquid level in the main refrigerant receiver 21, the circuit formed by the wires 89 and 91 become energized, thereby energizing the terminal 6 of the junction block 92, which, in turn, energizes the circuit formed by the wires 93 and 96, opening the solenoid valve 94. When the solenoid valve 94 is opened, the gas refrigerant contained under pressure in the auxiliary receiver 110 is allowed to flow into the pipe line 111, whereby it is discharged into the refrigerating system on the low pressure or gaseous side of the compressor 10. It follows that, when sufficient additional refrigerant has been added to the system, the liquid level of refrigerant in the main receiver 21 will rise above its minimum requirements, thereby causing the float 84 to rise in the float valve 81, forcing the float arm 86 upwardly until it reaches the point of its maximum setting where efficient operation and refrigeration is possible. When the maximum setting on the float arm 86 is reached, it will tilt the mercury switch 88 backwardly, de-energizing the electric circuit in the wires 89 and 91. This manner of recharging the main refrigerating system from the auxiliary tank 110 may be repeated as long as there is refrigerant in said tank without interrupting the operation of the refrigerating system in any way.

In the diagram of Figure 3, the auxiliary tank 110 is shown mounted to the main refrigerant receiver 21 by means of a suitable clamp 115. It will be appreciated, however, that any other suitable form of mounting may be used. In Figures 1 and 2, the main refrigerant receiver 21 for the refrigerating system is shown mounted within a portable or detachable unit 117. This is done because it makes it possible to substitute a new or different receiver 21 for the receiver forming a part of the original installation since the float control unit can be connected to the main receiver 21 much more conveniently at the factory than at the place of installation of the refrigerating system. It will be noted that a charging valve 118 is provided on the auxiliary tank 110 so that its refrigerant supply may be replenished without requiring removal of the same from the installation.

However, whenever the electric circuit of the wires 89 and 91 is energized, it will be apparent that the relay K, which is normally open, will close, lighting its emergency light 112 and causing a circuit to be energized in the wires 113 and 114. The wire 113 connects with the terminal 9 or the telephone terminal block 41, and the wire 114 connects with the terminal 9–N of said telephone terminal block, thereby causing an alarm to be given over the telephone wires 71 and 72 to the remotely located station 42.

The relay H, which is normally open, is connected by a wire 121 to terminal 4 of the junction block terminal 92. The terminal 4 is also connected by the wire 107 to the thermostat 106. A wire 122, forming the other part of the circuit to the relay H, leads to a terminal 123 on a time delay clock 124. The time delay clock 124 is energized by the wires 126 and 128. The wire 126 leads to the terminal 5 of the junction terminal block 92, which is, in turn, connected to the terminal 6 of said block by a wire 129 and through the wire 130 to the neutral terminal N of the service entrance block 33, which, in turn, connects through the wire 37, fuse 31, to the fourth or ground wire 26.

When the temperature in the refrigerated area or room 17 rises above a predetermined maximum setting, which, for example, will be considered for purposes of explanation as 50 degrees F., the thermostat 106 at that temperature will close its contacts and energize the circuit formed by the wires 104 and 107, thereby energizing the terminal 4 of the junction terminal block 92, which, in turn, energizes the wire 128 to the time delay clock 124. The time delay clock 124 is of a conventional construction, and, for purposes of explanation, it will be assumed that it has been set to delay any signal received by it for a period of two hours, but, of course, it will be understood that the period of time delay can be regulated for various periods within the range of the clock used.

When the period of time for which the time delay clock 124 has been set has expired, the clock will close its contacts, thereby energizing the circuit formed by the wires 126 and 128, causing it to energize the circuit of the wire 122 to the relay H, which is normally open. The relay H now closes, closing a circuit formed by the wires 133 and 134. The wire 133 leads to the terminal 8 of the telephone terminal block 41 and the wire 134 leads to the terminal 8–N of said same block, thereby energizing the telephone circuit of the wires 71 and 72 and sending an alarm to the remotely distant telephone station 42.

The portable or detachable unit

Referring now to Figure 1 of the drawings, the compact portable and detachable unit is shown assembled and ready to be taken to its place of installation on a commercial refrigerating system. This unit consists of a carrying case or supporting structure 117. For convenience of installation, the main refrigerant receiver 21 is included therein for ready substitution with the existing receiver of the refrigerating system at the place of installation. It is far easier to substitute main receivers than to drill openings in the existing receiver for the installation of the necessary pipes or tubes connecting with the refrigerating system and the float assembly. It will be noted that the new or substitute receiver is provided with tubes or pipes 82 and 83 for easy connection with the refrigerating system, and that the float control valve 81 is shown connected by its tubes or pipes 82 and 83, making such connections unnecessary at the place of installation.

The electric relays G–1, G–2, G–3, H and K are all mounted within a closed and approved electric cabinet or box 118, which has openings through its removable front cover 119 for the mounting of the signal lights of the system. The service entrance block 33 and the junction terminal block 92 are mounted in an approved manner on the back of said box 118 where they cannot be seen from a front view.

The telephone terminal block 41 is mounted in its own junction box positioned on top of the box 118, which provides suitable and convenient means for connecting the assembly with a conventional telephone, fire alarm or burglary warning system without requiring the opening of the main electrical box 118.

Summary of operations

When the power is off at any phase in the incoming electrical circuit, or a fuse has been blown in any phase, the relay connected with that phase will become de-energized, closing its contacts, causing its pilot light to be extinguished and an alarm to be given over its connecting telephone circuit to any remotely distant station connected therewith.

For example, when the power is off for phase I, its pilot light 43 will become extinguished and its parallel connected relay G–1 will close, sending a signal through the telephone terminals 7 and 7–N to the remotely distant station 42.

When the power is off for phase II, its pilot light 47 will be extinguished and its parallel connected relay G–2 will close, sending a signal through the telephone terminal 7 and 7–N over its connecting system to the remotely distant station 42.

Likewise, when the power is off for phase III, its pilot light 61 will be extinguished and its parallel connected relay G–3 will close, sending a signal through the telephone terminals 7 and 7–N over its connecting circuit fromed by the wires 71 and 72 to the remotely distant station 42.

The float valve 81 is operated by the liquid level in the main refrigerant receiver 21, and, when it is operating within its minimum and maximum levels for good efficiency, its controls are normally closed. When the liquid level in the main receiver 21 becomes low, either due to a leak, clogged line, etc., the float arm 86, which is drawn downwardly by the float 84, tilts the mercury switch 88 into a position to close its contacts and energize the circuit formed by the wires 89 and 91. This action causes the solenoid valve 94 to be energized and opened, thereby permitting refrigerant from the auxiliary tank 110 to escape into the pipe line 111 and be withdrawn into the refrigerating system on the low pressure or suction side of the compressor 10. Obviously, when sufficient additional refrigerant has been added to the refrigerating system, the amount of liquid in the main receiver 21 will increase and rise, carrying the float 84 upwardly until its float arm 86 tilts the mercury switch 88 backwardly, opening its contacts and de-energizing the circuit formed by the wires 89 and 91.

Every time the circuit 89 and 91 is energized to the solenoid valve 94, the parallel circuit 97 and 98 is energized to the relay K, causing it to close, energizing the circuit formed by the wires 113 and 114, which carry a signal to the remotely distant telephone station 42 and at the same time lights up the parallel connected emergency light 112.

The thermostat 106 is located in the refrigerated area 17, and is adjustable to open and close its contacts between certain predetermined minimum and maximum settings. For example, in a conventional commercial refrigerating system, the thermostat 106 might be set for a minimum of 38 degrees F. and a maximum of 50 degrees F. With such settings, whenever the temperature in the refrigerated area 17 reaches the maximum setting of 50 degrees F., the contacts of the thermostat 106 will be closed, energizing the time delay clock 124. After a period of time, which has been predetermined by the setting of the time delay clock, as for example, two hours, and the temperature in said refrigerated area 17 has not been lowered below 50 degrees F. where the contacts of the thermostat 106 will have been reopened, the time delay clock 124 will shut-off, thereby closing its micro-switch, which will cause the circuit to the relay H to be closed, energizing the circuit in the wires 133 and 134 to the telephone terminals 8 and 8–N, causing a signal to be given at the remotely distant telephone station 42. However, it will be appreciated that, if the temperature in the refrigerated 17 has been lowered to the minimum setting of 38 degrees F., the thermostat 106 will open its contacts and circuit, thereby de-energizing the time delay clock 124 so that no signal can be sent forth.

This time delay arrangement has been found necessary to avoid the sending of unnecessary signals to the remotely distant receiving station 42. Frequently, in large commercial installations, large quantities of warm foods are stored in the refrigerated area 17, and, even if the refrigerating system is operating satisfactorily, it is impossible to lower the temperature below the maximum setting for a period of time, as for example, within a two hour period covered by said time delay clock 124. Then, again, someone may fail to close the entrance door and the temperature in the refrigerated area will rise in spite of the continuous operation of the refrigerating system. Generally, such conditions will be corrected within a short period of time, and, if so, there is no need to send a signal to the remotely distant station 42. If, however, such conditions are not corrected within the period predetermined by the setting of the time delay clock 124, a signal will be sent to said remote station 42 so that an investigator will call to inspect the situation.

The present invention has been shown and described in detail in conjunction with a float valve since that is the most economical method of operation at the present time, but it is well within the ability of anyone skilled in the electrical art to substitiute another means of control for said float valve. For example, a probe could be inserted inside of the main refrigerant receiver to give conductive operation to the mercury switch for operating the solenoid valve when the liquid in said receiver drops below a predetermined operating level. Then, too, other means may be mounted on the outside of the main refrigerant receiver, which would have no direct contact with the liquid therein, but would control the operations of the solenoid valve through electronics or sonics. It is also apparent that such control could be operated effectively through a sight glass and an electric eye.

Although I have described in detail but one form which the invention may assume, it will be readly apparent to those skilled in the art that the invention is not to be so limited, but that various other and further modifications may be made therein without departing from the spirit thereof or from the scope of the appended claims.

What I claim is:

1. In a refrigerating system having a compressor, a refrigerant receiver, an evaporator, refrigerating coils within a refrigerated area, a condenser and means for operating said compressor, and, in combination therewith, an auxiliary tank for holding a quantity of refrigerant in gaseous form connected to the low pressure side of said system, means connected to said refrigerant receiver and operable by the quantity of liquid therein for recharging said system with gas from said auxiliary tank when the amount of refrigerant in said receiver drops below a predetermined amount and for shutting off the flow of refrigerant from said auxiliary tank when the quantity of refrigerant in said receiver rises above a predetermined amount, and means for giving an alarm when a recharging of refrigerant has taken place.

2. In a refrigerating system having a compressor, a refrigerant receiver, an evaporator, refrigerating coils within a refrigerated area, a condenser and means for operating said compressor, and, in combination therewith, an auxiliary tank for holding a quantity of refrigerant connected to said system, means connected to said refrigerant receiver and operable by the quantity of liquid therein for recharging said system with refrigerant from said auxiliary tank when the amount of refrigerant in said receiver drops below a predetermined amount and for shutting off the flow of refrigerant from said auxiliary tank when the quantity of refrigerant in said receiver rises above a predetermined amount, and means for giving an alarm when a recharging of refrigerant has taken place.

3. In a refrigerating system having a compressor, a refrigerant receiver, an evaporator, refrigerating coils within a refrigerated area, a condenser and means for operating said compressor, and, in combination therewith, an auxiliary tank for holding a quantity of refrigerant connected to said system, means connected to said refrigerant receiver and operable by the quantity of liquid therein for recharging said system with refrigerant from said auxiliary tank when the amount of refrigerant in said receiver drops below a predetermined amount and for shutting off the flow of refrigerant from said auxiliary tank when the quantity of refrigerant in said receiver rises above a predetermined amount, and means for giving an alarm at the place of installation of said refrigerating system and over a conventional communication system at a station remotely distant from said place of installation.

4. In a refrigerating system having a compressor, a refrigerant receiver, an evaporator, refrigerating coils within a refrigerated area, a condenser and means for operating said compressor, and, in combination therewith, an alarm system, means for giving an alarm at the place of installation of said system when a fuse has blown, and means having a connection with a conventional communication system whereby a second alarm may be given over said system to a station remotely distant from the place of installation of said refrigerating system if the fuse has not been replaced within a predetermined period of time.

5. In a refrigerating system having a compressor, a refrigerant receiver, an evaporator, refrigerating coils within a refrigerated area, a condenser and means for operating said compressor, and, in combination therewith, an alarm system, means connected to said refrigerated area for sounding a delayed alarm when the mechanical units of said refrigerating system are operating satisfactorily but the temperature in said refrigerated area remains above a predetermined setting for a predetermined period of time, said alarm being connected with a conventional communication system whereby an alarm may be given over said system to a station remotely distant from the place of installation of said refrigerating system.

6. In a refrigerating system having a compressor, a main refrigerant receiver connected with the high pressure side of said compressor, an evaporator connected with said main receiver, a refrigerating coil mounted within a refrigerated area having its receiving end connected with said evaporator and its discharge end connected with said low pressure side of said compressor, means for operating said compressor, and, in combination therewith, an auxiliary tank for storing an emergency quantity of refrigerant in gas form, means for introducing said emergency gas refrigerant from said auxiliary tank into said refrigerating system on the low pressure side of said compressor when the amount of refrigerant in said receiver falls below a predetermined amount, and means for giving an alarm when refrigerant has been added to said refrigerating system from said auxiliary tank.

7. In a refrigerating system having a compressor, a main refrigerant receiver connected with the high pressure side of said compressor, an evaporator connected with said main receiver, a refrigerating coil mounted within a refrigerated area having its receiving end connected with said low pressure side of said compressor, means for operating said compressor, and, in combination therewith, an auxiliary tank for storing an emergency quantity of refrigerant in gas form, means including a float valve for introducing said emergency gas refrigerant from said auxiliary tank into said refrigerating system on the low pressure side of said compressor when the amount of refrigerant in said main receiver falls below a predetermined amount, and means for giving an alarm when refrigerant has been added to said refrigerating system from said auxiliary tank.

8. A portable unit adapted to be detachably installed in an operating refrigerating system comprising a carrying case, an auxiliary tank mounted on said carrying case for holding an emergency quantity of refrigerant, control means to be connected operatively to said refrigerating system, said control means adapted to introduce refrigerant from said auxiliary tank into said system when the refrigerant therein falls below a certain predetermined amount, means connected with a conventional warning system for sounding an alarm over said system to a remotely located station when refrigerant from said auxiliary tank has been introduced into said refrigerating system, and means for connecting said unit to an outside source of electrical energy for operating the same in conjunction with said refrigerating system.

9. A portable unit adapted to be detachably installed in an operating refrigerating system comprising a carrying case, means adapted to be operatively connected to the refrigerant receiver of said refrigerating system, an auxiliary tank for holding a quantity of refrigerant mounted on said carrying case, said means being connected with said auxiliary tank for releasing emergency gas refrigerant therefrom into said refrigerating system when the amount of refrigerant in said receiver falls below a predetermined minimum, said carrying case containing means for connection with a conventional warning system for sounding an alarm over said system to a remotely located station when refrigerant has been withdrawn from said auxiliary tank, and means for connecting said unit to an outside source of electric energy for operating the same in conjunction with the refrigerating system.

10. A portable unit adapted to be detachably installed in an operating refrigerating system comprising a carrying case, an auxiliary tank adapted to hold an emergency quantity of refrigerant mounted on said carrying case, means including a float valve adapted to be connected to the main refrigerant receiver of said system, said valve being operatively connected with a solenoid valve adapted to release emergency refrigerant from said auxiliary tank into said system, said float control having a predetermined setting whereby refrigerant may be added automatically when the supply of refrigerant in said system falls below a certain minimum amount and a predetermined setting whereby the refrigerant from said auxiliary tank may be shut-off when the supply of refrigerant in said system has been replenished above a certain maximum amount, said unit having means for connection with a conventional warning system for giving an alarm over said system to a remotely distant station when refrigerant has been withdrawn from said auxiliary tank, and means for connecting said unit to an outside source of electric energy for operating said unit in conjunction with said refrigerating system.

11. In a refrigerating system having a compressor, a main refrigerant receiver connected with the high pressure side of said compressor, an evaporator connected with said main receiver, a refrigerating coil mounted within a refrigerated area having its receiving end connected with said evaporator and its discharge end connected to the low pressure side of said compressor, means for operating said compressor, and, in combination therewith, an auxiliary tank for storing an emergency quantity of refrigerant in gas form, means including a float control which actuates when the refrigerant in said main receiver falls below a predetermined amount to introduce refrigerant from said auxiliary tank into said refrigerating system, said float control having means for shutting-off the flow of refrigerant from said auxiliary tank into said system when the amount of refrigerant in said main receiver rises to a predetermined amount, said float control operating a relay when refrigerant is introduced from said auxiliary tank into said receiver, said relay being connected with a conventional warning system whereby an alarm will be given at a station on said system remotely distant from said refrigerating system when said relay is operated by said float control means.

12. In combination with a refrigerating system having a refrigerated area, means connected with said area for controlling the temperature range therein, a second means for giving an alarm at the place of installation of said system when the temperature in said area rises above a predetermined setting, and a third means for energizing a conventional communication system to give an alarm at a station remotely distant from the place of installation of said refrigerating system when the temperature in said area rises above a predetermined setting.

13. In combination with a refrigerating system having a refrigerated area, means for controlling the temperature range within said refrigerated area, a second means for giving an alarm at the place of installation of said system when the temperature in said refrigerated area rises above a predetermined setting, and a third means for energizing a time delay clock which upon expiration of a predetermined amount of time will energize a conventional communication system in order to give an alarm at a station remotely distant from the place of installation of said system when the temperature in said area rises above a predetermined setting.

14. In combination with a refrigerating system having a refrigerated area, thermostatic means in said area for controlling the temperature range therein, means connected with said thermostatic means for giving an alarm at the place of installation of said system when the temperature in said area rises above a predetermined setting and for energizing a time delay clock, said clock being connected with a conventional communication system for sounding an alarm at a station remotely distant from the place of installation of said system at the end of its elapsed time setting if the temperature in said refrigerated area has not been lowered sufficiently within said elapsed time setting.

15. In a refrigerating system having a compressor, a refrigerant receiver, an evaporator, refrigerating coils, a refrigerated area, a condenser and means for operating said compressor, and, in combination therewith, means for giving a local alarm at the place of installation of said system when the same is not functioning properly, and a second means associated with said local alarm means for giving an alarm over a conventional communication system at a station remotely distant from the place of installation of said refrigerating system, means for delaying the sending of said second alarm, and means for preventing the sending of said second delayed alarm if the temperature of said refrigerated area has been lowered sufficiently during said delaying period.

References Cited in the file of this patent

UNITED STATES PATENTS

| | | |
|---|---|---|
| Re. 19,700 | Williams | Sept. 10, 1955 |
| 1,662,558 | Zumbro | Mar. 13, 1928 |
| 2,082,035 | Smith | June 1, 1937 |
| 2,092,085 | Riley | Sept. 7, 1937 |
| 2,106,756 | Obermaier | Feb. 1, 1938 |
| 2,160,276 | McKee | May 30, 1939 |
| 2,195,388 | Schlumbohm | Mar. 26, 1940 |
| 2,439,331 | Bean | Apr. 6, 1948 |